No. 813,539. PATENTED FEB. 27, 1906.
G. VINCENT.
LAWN EDGER.
APPLICATION FILED OCT. 11, 1905.

UNITED STATES PATENT OFFICE.

GAIUS VINCENT, OF MINNEAPOLIS, MINNESOTA, ASSIGNOR OF ONE-HALF TO HENRY WOOLLETT, OF MINNEAPOLIS, MINNESOTA.

LAWN-EDGER.

No. 813,539.     Specification of Letters Patent.     Patented Feb. 27, 1906.

Application filed October 11, 1905. Serial No. 282,289.

*To all whom it may concern:*

Be it known that I, GAIUS VINCENT, a citizen of the United States, residing at Minneapolis, in the county of Hennepin and State of Minnesota, have invented certain new and useful Improvements in Lawn-Edgers; and I do hereby declare the following to be a full, clear, and exact description of the invention, such as will enable others skilled in the art to which it appertains to make and use the same.

My invention has for its object to provide a simple and efficient lawn-edging tool, adapted to be forced along the edge of a sidewalk and to cut a groove in the sod.

To the above ends the invention consists of the novel devices and combinations of devices hereinafter described, and defined in the claims.

As is well known, sod, if let run, will overlap the edges of sidewalks, giving the walk a very ragged appearance, to prevent which it has been customary to cut small grooves or trenches along the edges of the walk by means of knives, spades, or other tools not especially designed for that purpose and capable of use in accomplishing the result only by a great deal of labor. By the use of my improved trimmer the work may be very quickly and easily done, and, furthermore, a better job is accomplished.

The improved tool is illustrated in the accompanying drawings, wherein like characters indicate like parts throughout the several views.

Figure 1 is a view in side elevation showing the complete device. Fig. 2 is a front elevation of the improved device shown as applied in working position, a part of the handle thereof being broken away. Fig. 3 is a plan view of the device with the handle removed; and Fig. 4 is a view corresponding to Fig. 1, but illustrating a slightly-modified construction, a portion of the handle being broken away.

Referring to the construction illustrated in Figs. 1 to 3, inclusive, the numeral 1 indicates a handle, shown as provided at its lower end with prongs 2, to the ends of which prongs the cutting-tool is rigidly secured. This cutting-tool is made up of an angle-piece 3, a bottom plate 4, and a side plate 5, which parts are preferably formed from a single piece of sheet-steel. The angle-section 3 is adapted to engage and run upon the adjacent edge of the sidewalk z. The vertical plate of the angle portion 3 is preferably forwardly projected and provided with a knife-edge 3ª, that serves to force the sod away from the vertical edge of the walk. The bottom plate 4 is provided at its forward edge with a knife-edge 4ª, which adapts it to form the bottom of the groove cut in the ground or in the sod. The side plate 5 is provided at its forward edge with a knife-edge 5ª, that is adapted to cut the vertical wall of the groove which is formed in the ground or in the sod adjacent to the walk. It will be noted that the rear portion of the bottom plate 4 is turned upward and that the rear portion of the side plate 5 is curved inward, so that the strip of sod along the walk will be raised and turned sidewise out of line with the channel or groove.

In the construction illustrated in Fig. 4 a sharp-edged cutting-wheel 6 is pivoted to the side plate 5 and serves to cut the vertical wall of the channel. Otherwise the construction illustrated in Fig. 4 is the same as that previously described.

The device described while extremely simple has in practice been found in all respects satisfactory for the purposes had in view and has proven to be a great labor-saving device. The operator is permitted to stand in an erect position while cutting the groove with the improved device described, which in itself is an important feature. The edge of the walk serves as a guide for the tool and the tool cuts always a groove of determined width and depth.

What I claim, and desire to secure by Letters Patent of the United States, is as follows:

1. A lawn-edger comprising a channel-shaped cutter for cutting a groove, and provided with a guide-flange adapted to slide upon the upper surface of the adjacent edge of a sidewalk, of a handle formed with prongs at its lower end, said prongs being attached one to said guide-flange and the other to the outer side plate of said cutter, whereby a strip of sod loosened by the cutter may pass directly rearward between the prongs of said handle, substantially as described.

2. In a lawn-trimmer, the combination with a channel-shaped cutter having a guide-flange adapted to slide upon the upper surface of the adjacent edge of the sidewalk, the outer side of said side plate being curved at its rear portion, so as to turn the loosened strip of sod onto the sidewalk, of a handle having prongs at its lower end attached one to each side of said cutter, in such manner that the loosened sod may pass rearward between said prongs, substantially as described.

In testimony whereof I affix my signature in presence of two witnesses.

GAIUS VINCENT.

Witnesses:
 ROBERT C. MABEY,
 H. D. KILGORE.